United States Patent [19]
Bothra et al.

[11] Patent Number: 5,540,958
[45] Date of Patent: Jul. 30, 1996

[54] METHOD OF MAKING MICROSCOPE PROBE TIPS

[75] Inventors: Subhas Bothra; Milind G. Weling, both of San Jose, Calif.

[73] Assignee: VLSI Technology, Inc., San Jose, Calif.

[21] Appl. No.: 357,842

[22] Filed: Dec. 14, 1994

[51] Int. Cl.⁶ ........................................................ H05H 1/00
[52] U.S. Cl. ............................. 427/535; 427/569; 427/77; 427/271
[58] Field of Search ..................... 427/535, 569, 427/77, 271

[56] References Cited

U.S. PATENT DOCUMENTS

| | | | |
|---|---|---|---|
| 4,906,840 | 3/1990 | Zdeblick et al. | 250/306 |
| 4,978,421 | 12/1990 | Bassous et al. | 156/645 |
| 5,279,865 | 1/1994 | Chebi et al. | 427/574 |
| 5,382,274 | 1/1995 | Yamamoto et al. | 65/26 |
| 5,508,066 | 4/1996 | Akahori | 427/571 |

*Primary Examiner*—Benjamin Utech
*Attorney, Agent, or Firm*—Flehr, Hohbach, Albritton & Herbert

[57] ABSTRACT

A method of manufacturing a microscope probe tip comprises the steps of depositing a first material over a substrate, such as silicon oxide over a silicon substrate using chemical vapor deposition. The first material is patterned to define at least one structural protrusion. During this patterning, the first material is etched back. Then a second material, such as silicon oxide, is deposited over the protrusion using an electron cyclotron resonance (ECR) process, which grows a sloped surface to form the microscope probe tip. In another aspect of the invention, two different resolution Atomic Force Microscope (AFM) probe tips are grown. Then, the cantilevers are coupled together to provide an AFM with two probe tips having different resolutions.

18 Claims, 4 Drawing Sheets

5,540,958

METHOD OF MAKING MICROSCOPE PROBE TIPS

FIELD OF THE INVENTION

The present invention relates generally to a method of making a microscope probe tip. In particular, it relates to making a probe tip by depositing a second material over a protrusion created from a first material.

BACKGROUND OF THE INVENTION

An atomic force microscope (AFM) operates by using a probe to physically scan a surface. The probe includes a cantilever arm and a tip which contacts the sample to determine the surface characteristics. The shape of the tip determines the resolution of the scan. In general, a narrow and accurately manufactured probe tip has greater resolution than a broad and crudely manufactured probe tip.

Among the uses for AFMs is scanning surfaces such as thin-film semiconductor wafers to insure that the wafers are within manufacturing tolerances. As AFMs become more widely used in a variety of testing environments, techniques for the mass manufacture of precision probe tips become increasingly important.

A typical AFM probe tip is manufactured using a thin-film layering technique known in the semiconductor processing industry. For example, material layers are deposited, masked using conventional photolithography methods, and etched back to form a tip. Another example is where material layers are deposited through an aperture in order to create a tapered tip. A method of this type is disclosed in Zdeblick, U.S. Pat. No. 4,906,840. These techniques am time consuming and are not sufficiently precise to consistently provide high quality AFM tips.

SUMMARY OF THE INVENTION

The present invention provides a method for making microscope probe tips primarily for an atomic force microscope (AFM). A method of manufacturing an AFM probe tip comprises the steps of depositing a first material over a substrate, such as silicon oxide over a silicon substrate using chemical vapor deposition. The first material is patterned to define at least one structural protrusion. During this patterning, the first material is etched back. Then a second material, such as silicon oxide, is deposited over the protrusion using an electron cyclotron resonance (ECR) process, which grows a sloped surface to form the AFM probe tip.

In another aspect of the invention, two differently sized AFM probe tips are grown. Then, the cantilevers are coupled together to provide an AFM with two probe tips having different resolutions.

Advantages of the present method are that improved AFM probe tip yield and reliability is achieved and a precisely sloped tip is grown. Other features and advantages of the invention will appear from the following description in which a preferred embodiment has been set forth in detail, in conjunction with the accompanying drawings.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
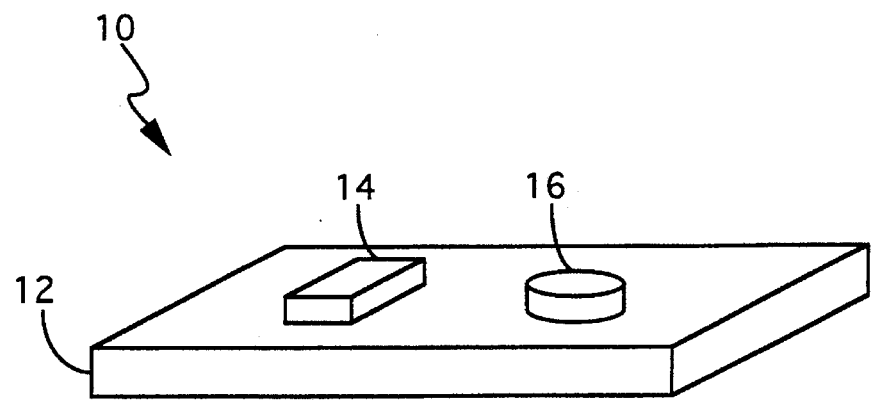
FIG. 1 depicts an AFM probe tip in a fabrication step having a substrate and a structural protrusion.
Figure 2:
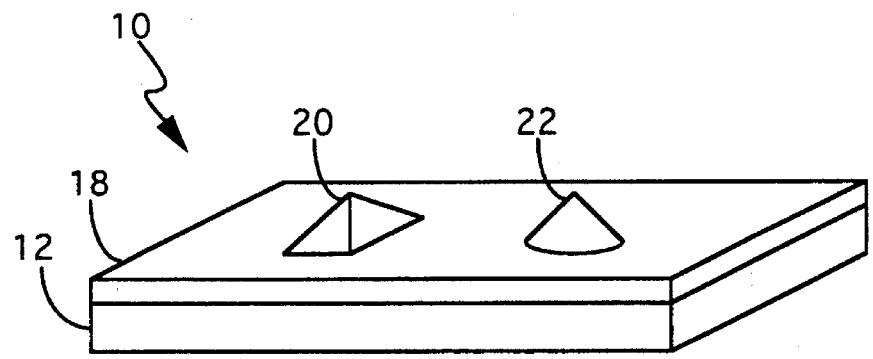
FIG. 2 depicts the AFM probe tip in a fabrication step having a substrate, a structural protrusion and a sloping surface third material layer.
Figure 3:
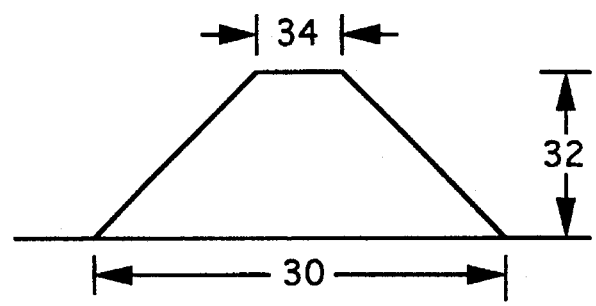
FIG. 3 depicts a side view of an AFM probe tip.

A preferred embodiment is directed toward making an atomic force microscope (AFM) probe tip and is described with respect to FIGS. 1–3. A wafer 10 is shown in FIG. 1 at an intermediate stage of fabrication. At this stage, a substrate 12 is covered with a first material layer such as a metal layer which has been patterned and etched away leaving structural protrusions 14 and 16. Alternately, the first material layer can be a polysilicon layer or silicon oxide layer. The deposition of the first material layer can be accomplished by any technique known in the art, such as chemical vapor deposition (CVD), plasma enhanced CVD (PECVD), sputtering, or electron cyclotron resonance (ECR). And, the etching step can be performed using any technique known in the art, such as dry etching or wet etching.

Once the protrusions 14, 16 are formed, an AFM probe tip is ready to be grown atop each of the protrusions. An ECR process is used to deposit a second material layer atop the protrusions 14, 16. ECR is a process known in the art for having precise deposition characteristics. For example, see Chebi et al, U.S. Pat. No. 5,279,865 for a detailed explanation of an ECR process. The ECR deposition process also includes a sputter-etching component which slopes the second material layer atop the protrusions. The result is a planar layer 18, which is conformal to the exposed substrate 12, and AFM probe tips 20, 22, which have precisely angled surfaces.

As shown in FIG. 2, the probe tip geometry is dependent on the shape of the protrusion. Probe tip 20 is pyramidal because the protrusion 14 is rectangular, and Probe tip 22 is conical because the protrusion 16 is circular.

A cut-away view of a probe tip is shown in FIG. 3. This view illustrates the approximate dimensions of an AFM probe tip made by this method. For example, the base width dimension 30 is between approximately 0.5–2 μm and the height dimension 32 is between approximately 0.25–1 μm. In practice, the height dimension is a function of the base width dimension and the time that the second material is permitted to grow on the protrusion. The tip width dimension 34 is also a function of the base width dimension and the time that the second material is permitted to grow on the protrusion. For example, the tip width dimension 34 is between approximately 0.01 to 0.5 μm.

The slope is typically 45° (aspect ratio of 1), and thus, the wider the protrusion, the greater the deposition time necessary for the tip to reach a peak where all sloping sides meet. Hence, a narrow protrusion (·0.5 μm) can produce a sharply defined AFM probe tip with a moderate deposition time (dimension 34 is small ·0.01 μm), and a wide (·2 μm) protrusion will produce a rounded AFM probe tip with a moderate deposition time (dimension 34 is large ·0.5 μm). This feature is advantageous because a variety of AFM tips with different resolutions are needed for scanning different surfaces—from coarse tips to fine tips. Each of these tips provides a specific resolution and noise figure. The finer the tip, the greater the resolution and the lesser the noise figure.

The types of materials that can be deposited by ECR include silicon, oxides such as $SiO_x$, nitrides such as SiN, metals and other materials. Moreover, since ECR is compatible with silicon processing, any material known in the art that can be deposited using a chemical vapor deposition technique can be used for forming a probe tip. In addition to growing a tip, it may be desirable to coat the tip with another material, such as a conductive material, e.g., metal. For example, a metal layer can be deposited using ECR to form a probe tip, or a metal layer can be sputtered or sputter-etched over an oxide layer deposited in accordance with the present invention to form a probe tip. Moreover, a tip can comprise a plurality of layers and can be made with one or more conductive metal layers if desired.

Figure 4:
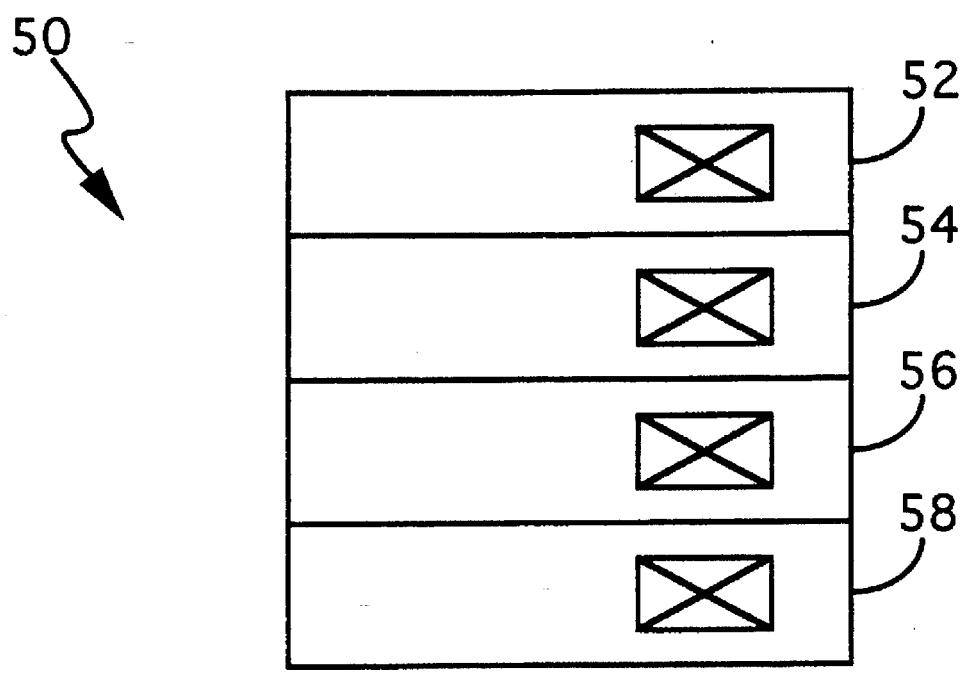
FIG. 4 depicts a plurality of AFM probe tips manufactured on the same substrate.

FIG. 4 shows a plurality of AFM probe tips manufactured simultaneously on the same wafer 50. This configuration is typically how the AFM probe tip manufacture proceeds, where a plurality of similarly constructed tips are made on the same wafer. After the tips are completed, the accompanying cantilevers 52–58 are separated, such as with a saw, and are then used in an AFM.

Figure 5:
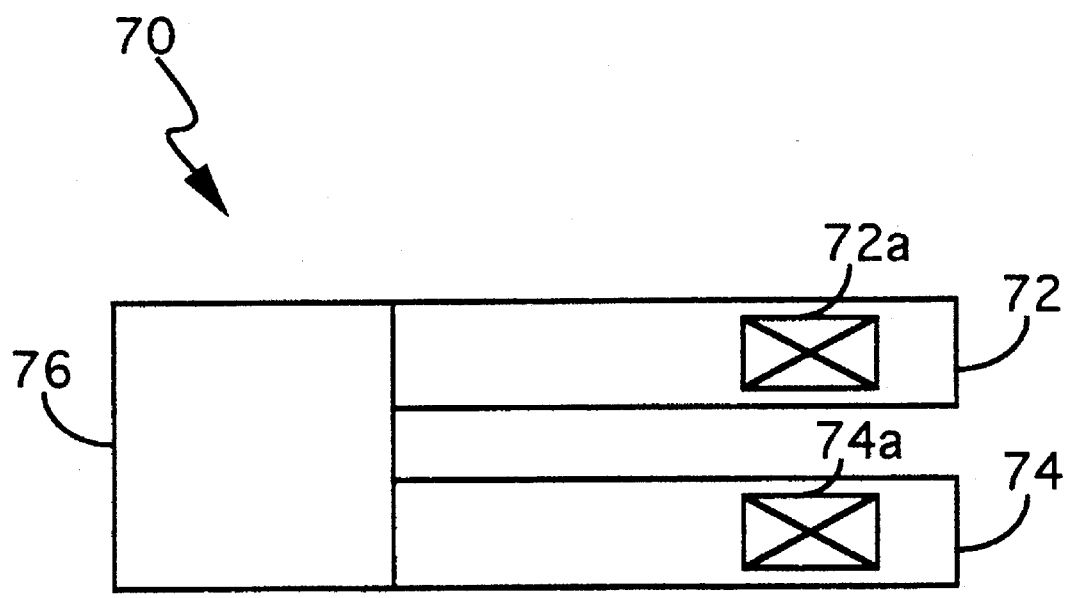
FIG. 5 depicts a plurality of AFM probe tips on independent cantilevers coupled together.

FIG. 5 shows an embodiment where two independent cantilevers 72, 74 are coupled together to a common attachment 76. The purpose of this configuration is to provide the AFM with a plurality of tips with which to scan the sample surface. Each of the cantilevers has a probe tip 72a, 74a respectively, that provides the AFM with a certain sensitivity depending on the tip's shape, e.g., a rough or fine resolution. For example, if tip 72a has a width of 2 μm and a height of 0.5 μm, then the resolution is rough. And if tip 74a has a width of 0.5 μm and a height of 0.25 μm, then the resolution is fine. When the two tips are coupled together in the manner shown, the AFM has the ability to discern both rough detail and fine detail to quantify the sample surface. That is, the rough resolution tip can quantify the surface generally and can overcome large steps in the surface, while the fine resolution tip can quantify the surface in detail even though it may give inaccurate readings where large steps occur. As a result, the AFM can quantify any number of different sample surfaces by incorporating a plurality of probe tips each having a different resolution. In this multiple tip configuration, the tips can be formed on the same substrate by patterning the first material to define different sized protrusions and then growing the respective tips by depositing tip material over the protrusions for the same time duration, or the tips can be formed on different substrates and then coupled together. In any case, the cantilevers should be attached to a rigid support to insure independent operation.

Alternatively, the cantilevers 72, 74 can have the same resolution tip. This can be accomplished by patterning the same sized protrusions on the same substrate, or by forming the tips on different substrates and then coupling the cantilevers together. This configuration provides twice the scan coverage for the sample and can reduce the time needed to scan the sample surface. Moreover, any number of cantilevers can be coupled together such as three, four or more.

Additional features that can be incorporated into the design of the cantilevers include semiconductor devices and integrated circuits. Because the present method is compatible with standard semiconductor processing techniques, the present method can include preceding, intervening or succeeding steps that involve the formation of semiconductor devices on the cantilever. The steps required to form semiconductor devices are known in the art and this example is intended to cover all such combinations in conjunction with the present method, insofar as such combinations are novel.

Figure 6:
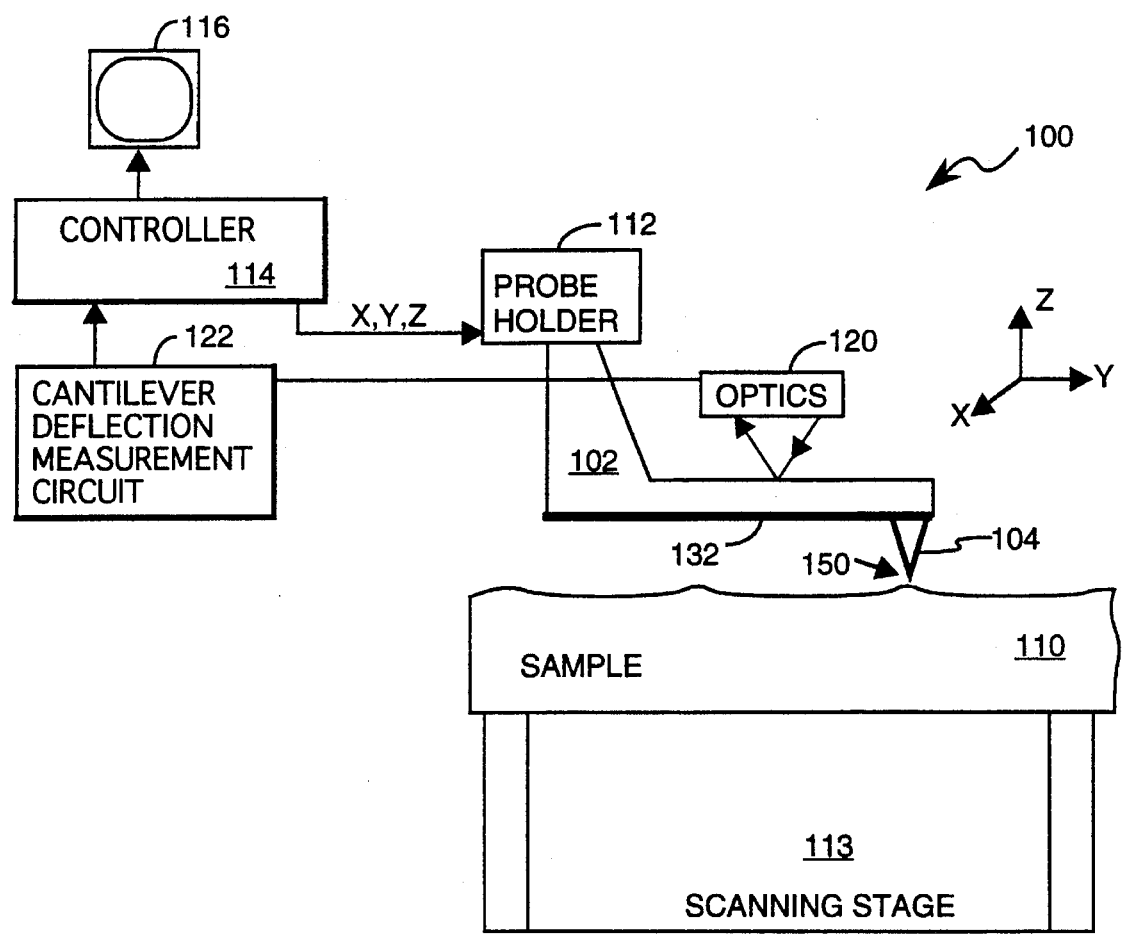
FIG. 6 depicts an AFM using a tip made by a method according to the invention.
Figure 7:
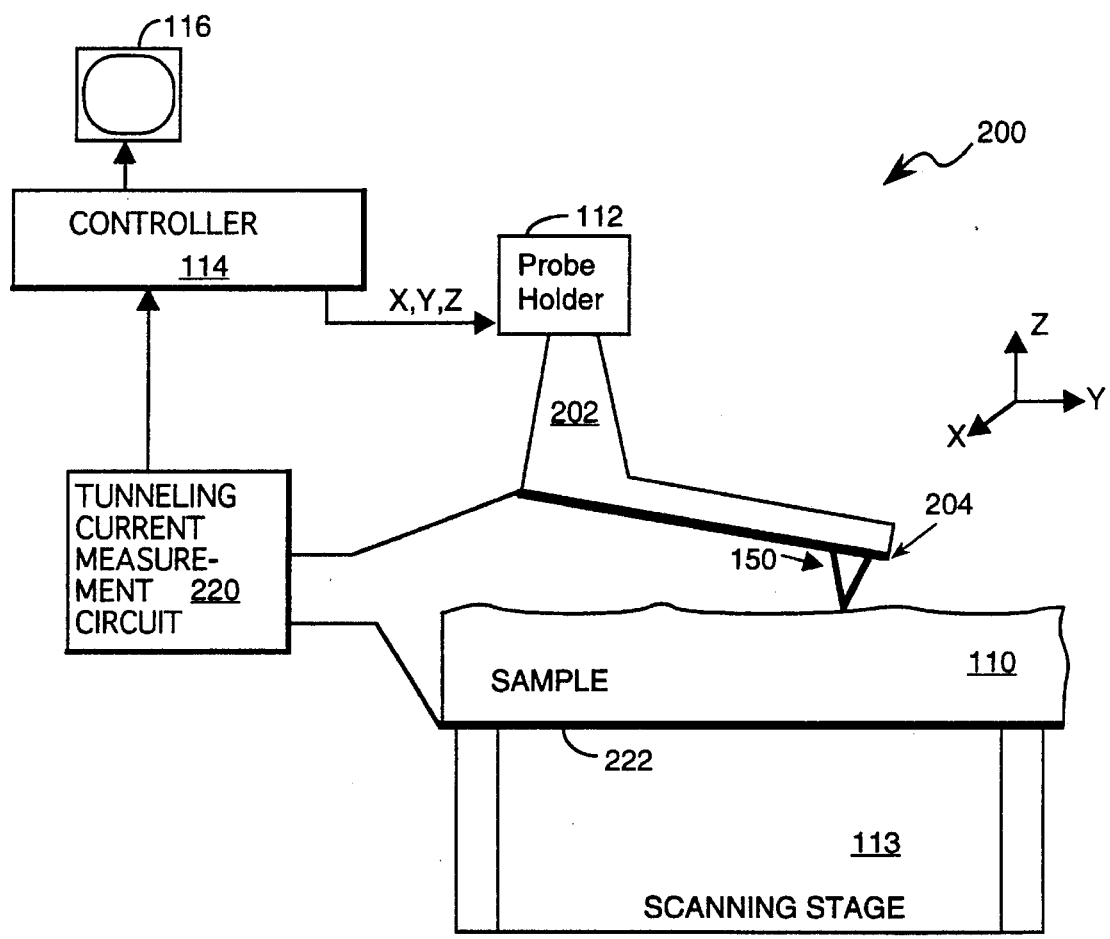
FIG. 7 depicts a scanning tunneling microscope (STM) using a tip made according to the invention.

To show examples of microscope probe tips in use, FIGS. 6 and 7 are provided to show an AFM and a scanning tunneling microscope (STM) respectively. Referring to FIG. 6, a diagram of an atomic force microscope 100 incorporating both AFM and near field optical sensors is depicted. A microminiature cantilever arm 102 with a tip 104 at its free end is used to probe the surface of a sample 110.

The sample 110 is mounted on a scanning stage 113. The sample's surface is scanned using a probe holder 112 that functions as an XYZ scanner to move the cantilever 102 while keeping the sample 110 stationary. Alternately, the sample is mounted on a "piezo scanning tube" type of XYZ scanning stage, which uses piezoelectric actuators to precisely move the sample 110 in the X, Y and Z directions. The cantilever 102 is kept stationary while an XYZ scanning stage 113 moves the sample 110 so as to scan the sample's surface. Those ordinarily skilled in the art will recognize that a separate Z translator apparatus for moving the probe 102 up and down relative to the sample 110 may also be utilized in lieu of a three axis scanning stage 113.

Regardless of whether the sample holder 113 or the probe holder 112 or both are used to move the probe relative to the surface of the sample, scanning is controlled by a programmed microcontroller or computer 114, which also analyzes measurement data and displays measurement information on display 116.

Measurements of the sample's surface topography or other characteristics are obtained by measuring deflection of the cantilever 102. Deflection of the cantilever is usually measured using precisely aligned optical components 120 coupled to a deflection measurement circuit 122, although other techniques are sometimes used.

Referring to FIG. 7, conventional scanning tunneling microscopes (STMs) are used primarily to monitor the electronic character of the surfaces being scanned. The STM assembly 200 has a cantilever 202 with a conductive tip 204. For instance, the tip is constructed of an oxide with metal deposited thereover. In this example the tip 204 is the apex of the cantilever 202 and is also used as the point at which tunneling current enters the STM probe from the sample 110. In other embodiments of the present invention the tip can be a projecting, conductive tip that projects away from the cantilever 202.

Tunneling currents in conductive or semiconductor samples are induced by placing a conductive tip 204 one to ten Angstroms above the sample 110, and introducing a low voltage electric field (typically less than one volt) between a conductive tip 204 and the sample 110, which is mounted on a metal plate 222 for ease of electrical connection to the sample. Tunnelling current, drawn from the tip through the one to ten angstrom gap 150 between the tip 204 and sample 110, is indicative of the size of the gap 150. STMs typically have two modes of operation. The first is constant height mode, for very flat samples, in which the tip is scanned at a constant height and the tunneling current is measured to determine the topography of the sample. The second mode is constant current mode, in which tunneling current is kept constant by varying the height of the cantilever until a preselected current level is restored.

Tunneling current measurement circuitry 220, coupled to both the tip and the sample 110, controls the application of a current inducing voltage on the tip 204 anti measures the magnitude of the resulting tunneling current. The measurement data, or images generated from that data, are displayed on display device 116 after appropriate processing by the controller 114.

Having disclosed a preferred embodiment and the best mode, modifications and variations may be made to the disclosed embodiments while remaining within the scope of the present invention as defined by the claims.

What is claimed is:

1. A method of manufacturing a microscope probe tip comprising the steps of:
   depositing a first material over a substrate;
   patterning said first material to define a first protrusion; and
   depositing a second material over said first protrusion using an ECR process to grow a first microscope probe tip having a sloped surface.

2. The method of claim 1, further comprising the step of: depositing a conductive third material over said second material.

3. The method of claim 1, wherein:
   said patterning said first material is performed to define a cylindrical protrusion; and
   said depositing said second material is performed to grow a conical tip over said cylindrical protrusion.

4. The method of claim 1, wherein:
   said patterning said first material is performed to define a rectangular protrusion; and
   said depositing said second material is performed to grow a pyramidal tip over said rectangular protrusion.

5. The method of claim 1, further comprising the steps of:
   depositing a third material over a second substrate;
   patterning said third material to define a second protrusion;
   depositing a fourth material over said second protrusion using an ECR process to grow a second microscope probe tip having a sloped surface;
   configuring said first microscope probe tip on a first cantilever;
   configuring said second microscope probe tip on a second cantilever; and
   coupling said first cantilever and said second cantilever together.

6. The method of claim 1, further comprising the steps of:
   depositing a third material over said substrate;
   patterning said third material to define a second protrusion;
   depositing a fourth material over said second protrusion using an ECR process to grow a second microscope probe tip having a sloped surface;
   configuring said first microscope probe tip on a first cantilever; and
   configuring said second microscope probe tip on a second cantilever.

7. A method of manufacturing a microscope probe tip comprising the steps of:
   depositing a first material directly on top of a substrate;
   patterning said first material to define a protrusion;
   depositing a second material directly on top of said protrusion using an ECR process to grow a first microscope probe tip having a sloped surface.

8. The method of claim 7, further comprising the step of:
   depositing a conductive third material directly on top of said second material.

9. The method of claim 7, wherein:
   said patterning said first material is performed to define a cylindrical protrusion; and
   said depositing said second material is performed to grow a conical tip over said cylindrical protrusion.

10. The method of claim 7, wherein:
    said patterning said first material is performed to define a rectangular protrusion; and
    said depositing said second material is performed to grow a pyramidal tip over said rectangular protrusion.

11. The method of claim 7, further comprising the steps of:
    depositing a third material directly on top of a second substrate;
    patterning said third material to define a second protrusion;
    depositing a fourth material directly on top of said second protrusion using an ECR process to grow a second microscope probe tip having a sloped surface;
    configuring said first microscope probe tip on a first cantilever;
    configuring said second microscope probe tip on a second cantilever; and
    coupling said first cantilever and said second cantilever together.

12. The method of claim 7, further comprising the steps of:
    depositing a third material directly on top of said substrate;
    patterning said third material to define a second protrusion;
    depositing a fourth material directly on top of said second protrusion using an ECR process to grow a second microscope probe tip having a sloped surface;
    configuring said first microscope probe tip on a first cantilever; and
    configuring said second microscope probe tip on a second cantilever.

13. A method of manufacturing a microscope probe tip comprising the steps of:
    depositing a first metal layer over a silicon substrate;
    patterning said first metal layer to define a first protrusion; and
    depositing a first oxide layer over said first protrusion using an ECR process to grow a first microscope probe tip having a sloped surface.

14. The method of claim 13, further comprising the step of:
    depositing a second metal layer over said first oxide layer.

15. The method of claim 13, wherein:
    said patterning said first metal layer is performed to define a cylindrical protrusion; and
    said depositing said first oxide layer is performed to grow a conical tip over said cylindrical protrusion.

16. The method of claim 13, wherein:
    said patterning said first metal layer is performed to define a rectangular protrusion; and
    said depositing said first oxide layer is performed to grow a pyramidal tip over said rectangular protrusion.

17. The method of claim 13, further comprising the steps of:

depositing a second metal layer over a second silicon substrate;

patterning said second metal layer to define a second protrusion;

depositing a second oxide layer over said second metal layer using an ECR process to grow a second microscope probe tip having a sloped surface;

configuring said first microscope probe tip on a first cantilever;

configuring said second microscope probe tip on a second cantilever; and coupling said first cantilever and said second cantilever together.

18. The method of claim 13, further comprising the steps of:

depositing a second metal layer over said silicon substrate;

patterning said second metal layer to define a second protrusion;

depositing a second oxide layer over said second metal layer using an ECR process to grow a second microscope probe tip having a sloped surface;

configuring said first microscope probe tip on a first cantilever; and configuring said second microscope probe tip on a second cantilever.

* * * * *